(12) United States Patent
Weih et al.

(10) Patent No.: US 12,007,056 B2
(45) Date of Patent: *Jun. 11, 2024

(54) METHOD OF MANUFACTURING A TWO COMPONENT SEALING GASKET FOR PLASTIC PIPE

(71) Applicant: S & B Technical Products, Inc., Fort Worth, TX (US)

(72) Inventors: Mark A. Weih, San Jose (CR); Rodney Pacheco, Montes de Oca (CR)

(73) Assignee: S & B Technical Products, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,893

(22) Filed: Aug. 29, 2023

(65) Prior Publication Data

US 2023/0400136 A1  Dec. 14, 2023

Related U.S. Application Data

(62) Division of application No. 17/712,383, filed on Apr. 4, 2022, now Pat. No. 11,933,442.

(60) Provisional application No. 63/201,186, filed on Apr. 16, 2021.

(51) Int. Cl.
| | | |
|---|---|---|
| *F16J 15/02* | (2006.01) |
| *B29C 45/00* | (2006.01) |
| *B29C 45/14* | (2006.01) |
| *F16L 47/08* | (2006.01) |
| *B29K 23/00* | (2006.01) |
| *B29K 105/00* | (2006.01) |
| *B29L 31/26* | (2006.01) |

(52) U.S. Cl.
CPC .......... *F16L 47/08* (2013.01); *B29C 45/0001* (2013.01); *B29C 45/14475* (2013.01); *F16J 15/025* (2013.01); *B29K 2023/12* (2013.01); *B29K 2105/0097* (2013.01); *B29L 2031/265* (2013.01)

(58) Field of Classification Search
CPC .................................. F16J 15/02; F16J 47/08
See application file for complete search history.

(56) References Cited

U.S. PATENT DOCUMENTS

| | | |
|---|---|---|
| 3,856,315 A | 12/1974 | Stansbury |
| 4,826,028 A | 5/1989 | Vassallo et al. |
| 4,834,398 A | 5/1989 | Guzowski et al. |
| 7,140,618 B2 | 11/2006 | Valls, Jr. |
| 7,252,293 B2 | 8/2007 | Happel |
| 7,731,884 B2 | 6/2010 | Knapp et al. |
| 8,474,830 B2 | 7/2013 | Knapp |
| 8,622,399 B2 | 1/2014 | Monteil |
| 9,593,787 B2 | 3/2017 | Monteil et al. |
| 10,648,602 B2 | 5/2020 | Quesada |

(Continued)

*Primary Examiner* — Vishal A Patel
(74) *Attorney, Agent, or Firm* — Whitaker Chalk Swindle & Schwartz, PLLC; Charles D. Gunter, Jr.

(57) ABSTRACT

A pipe sealing gasket is shown which is designed to be received within a raceway provided within the female, belled end of a section of plastic pipe which is assembled with a mating male pipe end to form a plastic pipe joint. The gasket is a two-component gasket having a softer, elastomeric portion and a harder, plastic ring portion. A splicing technique is used to form the softer, elastomeric portion with the harder, plastic portion being injection molded over the previously formed elastomeric portion.

11 Claims, 11 Drawing Sheets

(56) References Cited

U.S. PATENT DOCUMENTS

2014/0374995 A1 12/2014 Monteil et al.
2018/0245727 A1 8/2018 Quesada

METHOD OF MANUFACTURING A TWO COMPONENT SEALING GASKET FOR PLASTIC PIPE

CROSS-REFERENCE TO RELATED APPLICATION

The present application is a Divisional of U.S. patent application Ser. No. 17/712,383, filed Apr. 4, 2022, which claims priority from U. S. Provisional Patent Application Ser. No. 63/201,186, filed Apr. 16, 2021, with the same title and by the same inventors.

BACKGROUND OF THE INVENTION

Field of the Invention

The present invention relates generally to sealing gaskets and sealing systems used for pipe joints in plastic pipelines in which a male spigot pipe section is installed within a mating female socket pipe section to form a pipe joint and to a method for manufacturing such a gasket.

Description of the Prior Art

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications.

Earlier gasketed sealing systems are known in which a homogeneous rubber gasket was generally deformable, allowing it to be flexed or bent by hand, accepting inverse curvature, and inserted within a mating internal raceway formed in the female, belled pipe end. The raceway in the female pipe bell end was pre-formed, for example, using a collapsible mandrel belling tool at the pipe manufacturing facility. A prior art attempt to insure the integrity of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring with a stiffening band which was inserted into a mating groove provided on the internal diameter of the rubber ring.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, an elastomeric gasket was installed within an internal groove in the socket end of the female pipe as the female or belled end was simultaneously being formed. Rather than utilizing a preformed groove, the Rieber process provided a prestressed and anchored elastomeric gasket during the belling operation. Because the gasket was installed simultaneously with the formation of the belled pipe end, a rigid, embedded reinforcing ring could be supplied as a part of the gasket. Because the pipe groove was, in a sense, formed around the gasket with its embedded reinforcing ring, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Rieber process, the belling operation was somewhat complicated and costly. Also, certain situations exist in which it would be desirable to manually install a gasket in the field or at the manufacturing plant, or to remove one gasket and reinstall another within a preformed raceway in the selected pipe end, rather than utilizing an integrally installed gasket in which the groove in the pipe is formed around the gasket. So, in some instances, it may be desirable to have a gasket which can be installed by hand by simply bending and installing the gasket in the pipe raceway.

The principles of materials science, as applied to gaskets of the above type have also advanced significantly in recent years. Two component gaskets which feature a rubber-like section and a relatively harder plastic-type section have been developed in recent years which feature improved materials for the different sections. For instance, PP/TPV, PP/TPE and PP/EPEM gaskets have been manufactured in the past. Even thought such designs are known in the pipe sealing arts, there continues to exist a need for improved manufacturing processes and designs for manufacturing such gaskets.

Accordingly, one object of the present invention is to provide an improved gasket which is securely retained within a preformed pipe groove without the necessity of a separate retaining band.

Another object of the invention is to provide such a sealing gasket with attributes which allow it to seal under low pressure or non-pressure conditions without being twisted or extruded, or displaced during field assembly, and yet which can be installed by hand in the bell raceway of a plastic pipe.

Another object of the invention is to provide an improved manufacturing process for such a two-component gasket which process produces such a gasket at less cost and with fewer steps than those involved in certain of the presently known manufacturing processes.

SUMMARY OF THE INVENTION

Although the manufacturing techniques shown herein might be used with a variety of different styles of sealing gaskets for plastic pipe, the discussion which follows will be centered around a design especially suited for low pressure and non-pressure applications such as underground drainage and sewer lines. The preferred gaskets of the invention include a ring shaped, hard plastic band made, for example, of a suitable polyolefin, e.g., polypropylene (PP). The hard plastic band is joined to a separate region of rubber, synthetic rubber or thermoplastic elastomer (i.e., EPDM or TPV) which forms the primary sealing region for the gasket.

A unique manufacturing process is used to produce the gaskets of the invention. In the first step in the manufacturing method, a gasket section is extruded of a relatively softer rubber-like material to form a given length of material having opposing free ends and having a desired final profile cross section. Next, the opposing free ends of the gasket section are spliced together to form a continuous gasket band of the rubber-like material. The spliced gasket band is then placed in a conventional plastic injection mold and thereafter, a relatively harder plastic-like material is injected over the spliced gasket band in the mold. Under the influence of heat and pressure, the harder plastic-like material bonds to the relatively softer rubber-like gasket band to form a finished two-component sealing gasket.

The splicing step can be accomplished by using a conventional splicing adhesive to join the free ends of the gasket section. Preferably, the splicing step is accomplished by using using a hot PE or PP film that is placed between the two opposing free ends of the gasket section and holding the free ends together until they cool and form a strong bond therebetween. The opposing free ends of the gasket section can be heated, for example, by a heat source selected from the group consisting of a heating oven, a hot air gun, and an IR heater.

An improved pipe sealing gasket is also shown which is designed for receipt within a raceway provided within a female bell socket end of a thermoplastic pipe, the female bell socket end having a given internal diameter which is designed to receive a given outer diameter of a mating male thermoplastic pipe end to form a pipe joint. The improved gasket is formed with a a hard plastic ring shaped band having a leading nose region and a trailing region. The trailing region is bonded to a relatively softer elastomer ring of rubber-like material which has an outer circumferential surface which forms a seal with the raceway provided in the female bell socket and an inner circumferential surface which forms a seal with the male thermoplastic pipe end.

The hard plastic band supports the elastomer ring, providing adequate stiffness to develop contact pressure between the outer circumferential surface of the elastomer ring and the raceway of the bell socket end of the pipe and between the inner circumferential surface and the mating male pipe end.

The preferred sealing gasket is formed by the following steps:
 extruding a gasket section of a relatively softer rubber-like material to form a given length of material having opposing free ends and having a desired final profile cross section;
 splicing the opposing free ends of the gasket section together to form a continuous gasket band of the rubber-like material;
 placing the spliced gasket band in a conventional plastic injection mold;
 injecting a relatively harder plastic-like material over the spliced gasket band in the mold and allowing the harder plastic-like material to bond to the relatively softer rubber-like gasket band to form a finished two-part sealing gasket.

In one preferred form the gasket of the invention, both the elastomer outer circumferential surface and the inner circumferential surfaces of the elastomeric ring portion of the gasket form exposed circumferential sealing surfaces, both of which are provided with a series of circumferential lands and grooves for engaging the female pipe socket end and the mating male pipe as the pipe joint is made up.

Additional objects, features and advantages will be apparent in the written description which follows.

DETAILED DESCRIPTION OF THE INVENTION

The invention described herein and the various features and advantageous details thereof are explained more fully with reference to the non-limiting examples which are illustrated in the accompanying drawings and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

Figure 10:
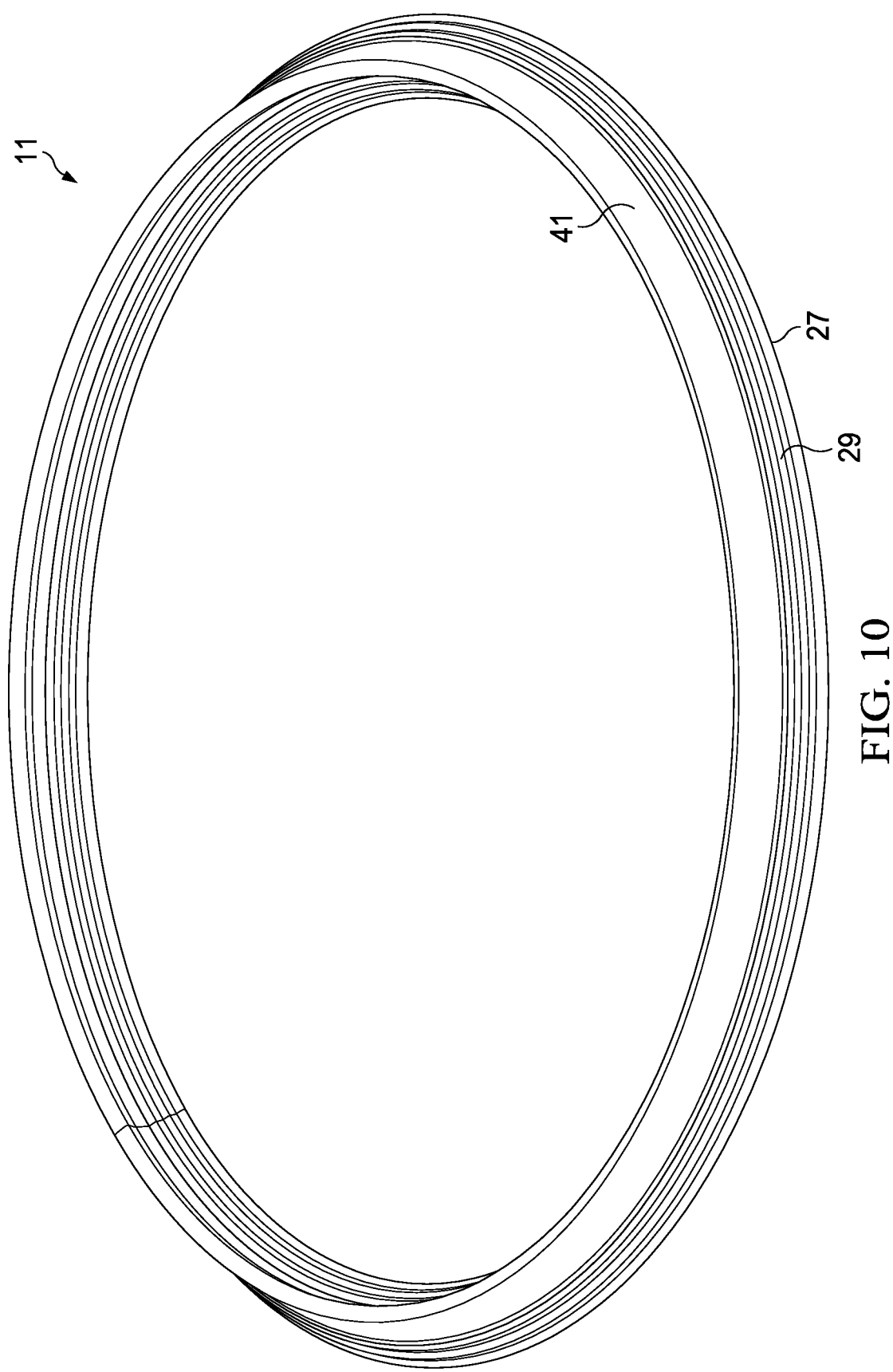
FIG. 10 is a perspective view of the completed gasket of the invention.
Figure 11:
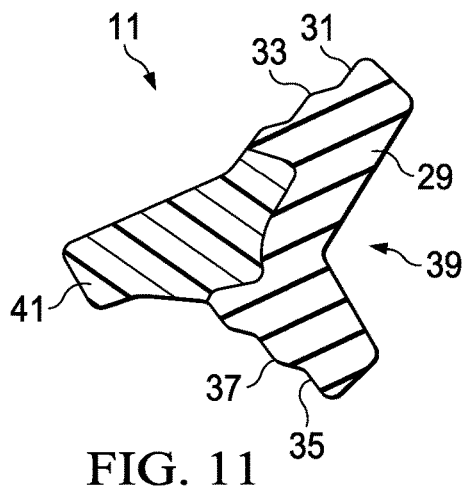
FIG. 11 is a cross sectional view of the gasket of FIG. 10.
Figure 12:
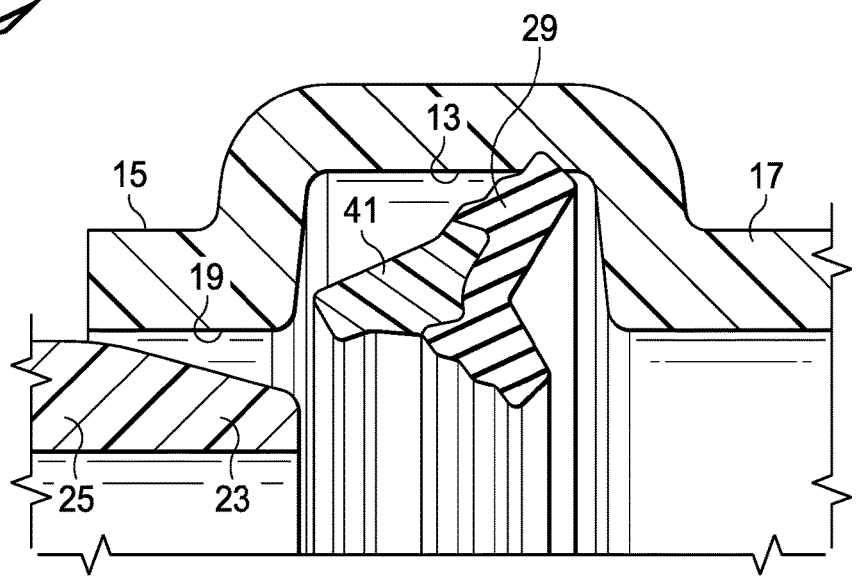
FIG. 12 is a partial sectional view of an end of a section of plastic pipe showing the bell end and raceway, with a gasket of the invention in place in the raceway, the male pipe section being in position for insertion into the bell.

With reference first to FIGS. 10-12, there is shown a pipe sealing gasket 11 which embodies the advantageous features of the invention. Although the method of the invention might be used to produce a variety of styles of sealing gaskets for pipelines, the description which follows will make primary reference to a gasket designed in accordance with the EN-1401-1 standard for PVC-U pipe and particularly to a gasket designed for low pressure or non-pressure applications for the waterworks/municipal markets using a combination of materials to form a two-component gasket.

FIG. 12 shows the gasket 11 installed within a raceway 13 provided within the belled end 15 of a female pipe section of thermoplastic pipe 17. The female pipe section 17 can be formed of any of a variety of commercially available thermoplastic materials, such as the polyolefin family including polyethylene and polypropylene as well as polyvinyl chloride and similar materials, most typically PVC. Thermoplastic pipes of this general type are used in a variety of industrial settings including water, sewage and chemical industries. The belled end 15 of the thermoplastic pipe section has a mouth opening 19 which is engageable with a spigot end 23 of a mating male pipe section 25 to form a pipe joint. The gasket receiving raceway 13, in this case, has been pre-formed in the pipe mouth opening 19 at the pipe manufacturing facility. The gasket of the invention is flexible enough to be hand installed in the raceway 13, or by using automated installation equipment.

FIG. 11 is a cross sectional view of the gasket 11, which gasket can be produced by the method of the invention. The gasket 11 can be seen to be an annular, ring-shaped member having a main gasket body (27 in FIG. 10). As seen in the cross sectional view of FIG. 11, the main body 27 includes a first portion 29 formed of a flexible elastomeric material, such as a suitable natural or synthetic rubber. The elastomeric material used to form the body portion 29 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), nitrile rubber, etc. One preferred synthetic material is EPDM rubber.

With reference again to FIG. 11, the elastomeric portion 29 includes an outer sealing surface 31 which, in this case, is provided with a series of ribs or serrations 33. The surface 31 forms a seal with the raceway provided in the belled end of the female pipe section (see FIG. 12). The elastomeric portion of the gasket body also includes a lower, primary sealing surface 35 which is also provided with ribs 37. As will be understood by those skilled in the relevant arts, the primary sealing surface 35 is a downwardly sloping face of the gasket body which forms a combination lip and compression seal region for the gasket. The lip region is separated from the outer sealing surface 31 by a V-shaped recess (shown generally as 39 in FIG. 11). The V-shaped recess allows the lip region of the gasket body to bend inwardly as the mating male, spigot end of a mating pipe section encounters the primary sealing surface 35 of the gasket.

As is further evident from FIG. 11, the elastomeric portion 29 of the gasket is reinforced by a relatively harder, plastic band region 41. The band 41 is a continuous circumferential ring. The gasket body can thus be thought of as a two-component gasket having a rubber element and as having a hard plastic element, the hard plastic element serving as the reinforcing element for the rubber portion of the gasket body. In use, the hard plastic region 41 both supports the elastomeric ring portion and provides adequate stiffness to develop contact pressure between the outer gasket body and the raceway (13 in FIG. 12) of the bell socket end of the pipe.

Figure 13:
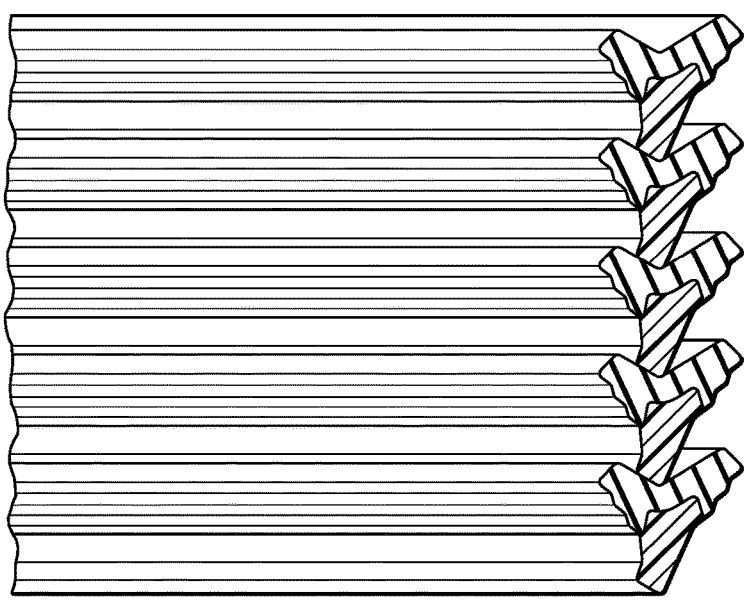
FIG. 13 is a perspective view illustrating the stackable nature of the gaskets of the invention.

As can be seen in FIG. 12, the hard plastic band region 41, together with the supported outer elastomer ring portion 29 form a V-shaped profile in cross section, the V-shape itself acting to promote a self-energizing behavior when hydrostatic pressure is applied to the pipe joint. In the particular example of the gasket shown in FIG. 12, both the elastomer outer ring portion 31 and the inner portion 35 of the gasket have exposed circumferential sealing surfaces which, as previously described, are provided with a series of circumferential lands and grooves (e.g., lands 33, 37) for engaging the raceway in the female pipe socket end and the mating male pipe, respectively, as the pipe joint is made up. The particular shape and cross sectional profile of the gaskets facilitate stacking of the individual gaskets for shipping or storage (see FIG. 13).

As was previously mentioned, the rubber portions of the gaskets of the invention can be formed of a rubber, such as for example, a thermoplastic elastomer such as a thermoplastic vulcanizate, or a more traditional rubber material such as a styrene butadiene rubber, ethylene propylene diene monomer rubber or nitrile rubber. EPDM rubber is one preferred material. The durometer of the rubber may vary depending on the end application but will typically be in the range from about 40-70 Shore A hardness, preferably about 40-60 Shore A. The hard plastic band 41, on the other hand, is formed of a synthetic plastic material having a durometer which is greater than the durometer of the rubber portions of the gasket. The synthetic plastic material used for the band 41 is preferably a material which shows an appropriate stiffness for the application at hand while allowing flexing during installation.

Although EPDM is a preferred material for the elastomeric portion of the gasket, other candidate materials for the rubber portion of the gasket include such materials as the "Thermoplastic Vulcanizates", referred to as TPV's. These materials are part of the thermoplastic elastomer (TPE) family of polymers. However, these materials have the characteristic of being closest in elastomeric properties to EPDM thermoset rubber, combining the characteristics of vulcanized rubber with the processing properties of thermoplastics.

Various hard plastic type materials may be suitable candidates for use as the hard plastic band portion of the gasket. These materials include such materials as the polyolefins, such as polypropylene, as well as other materials such as polyvinylchloride and various "engineered plastics." The preferred material for the instant application is a suitable polypropylene (PP). The preferred sealing gaskets are thus a PP-EPDM composite.

The sealing gasket design of the invention, which has been described, is only achieved by certain unique techniques used in the molding operation. As has been briefly discussed, there are various complications or limitations which are inherent in the prior art molding techniques which are overcome by the manufacturing method of the invention.

Figure 1:
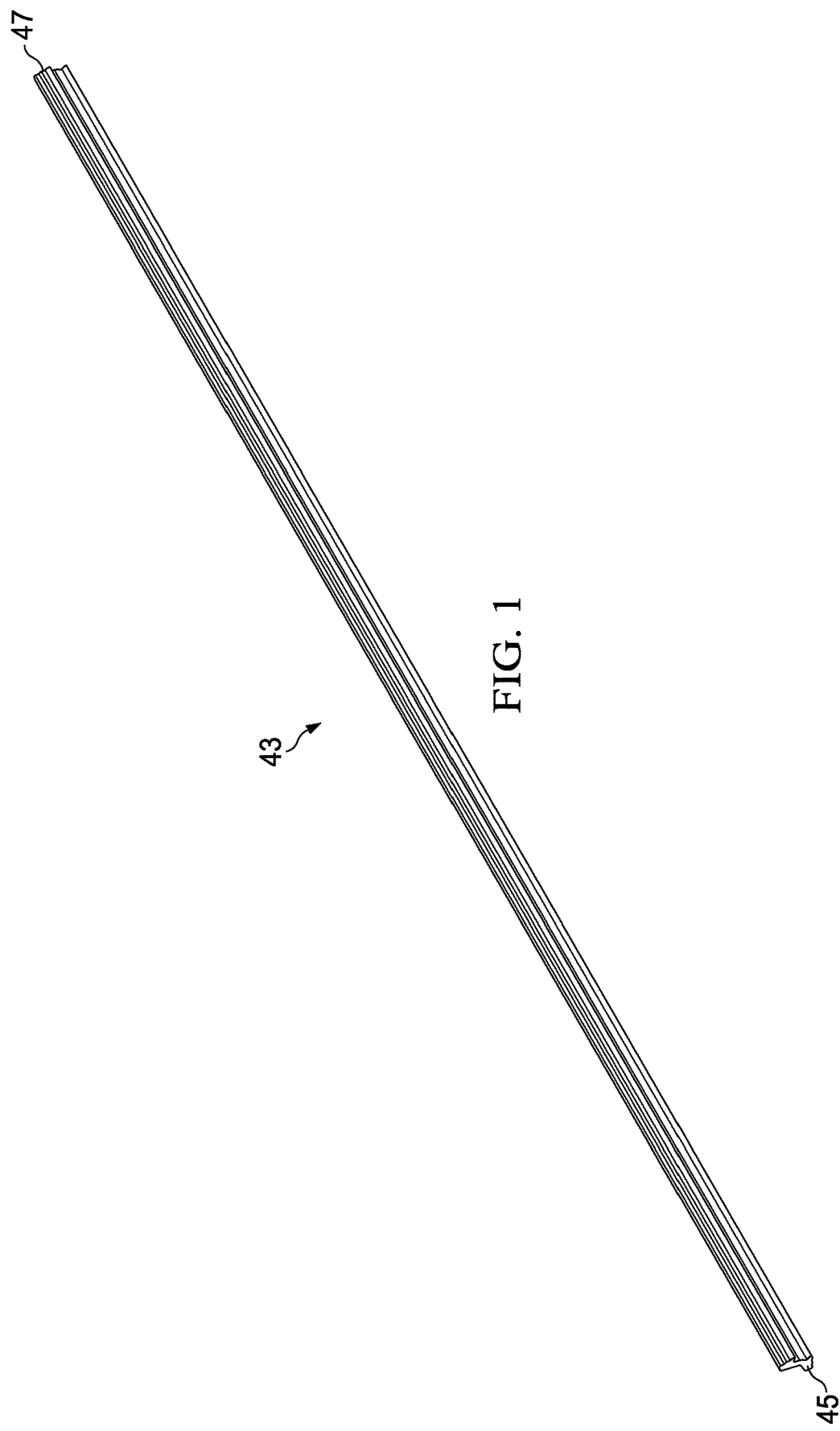
FIG. 1 is a perspective view of an extruded rubber portion of gasket of the invention prior to splicing the ends thereof.
Figure 2:
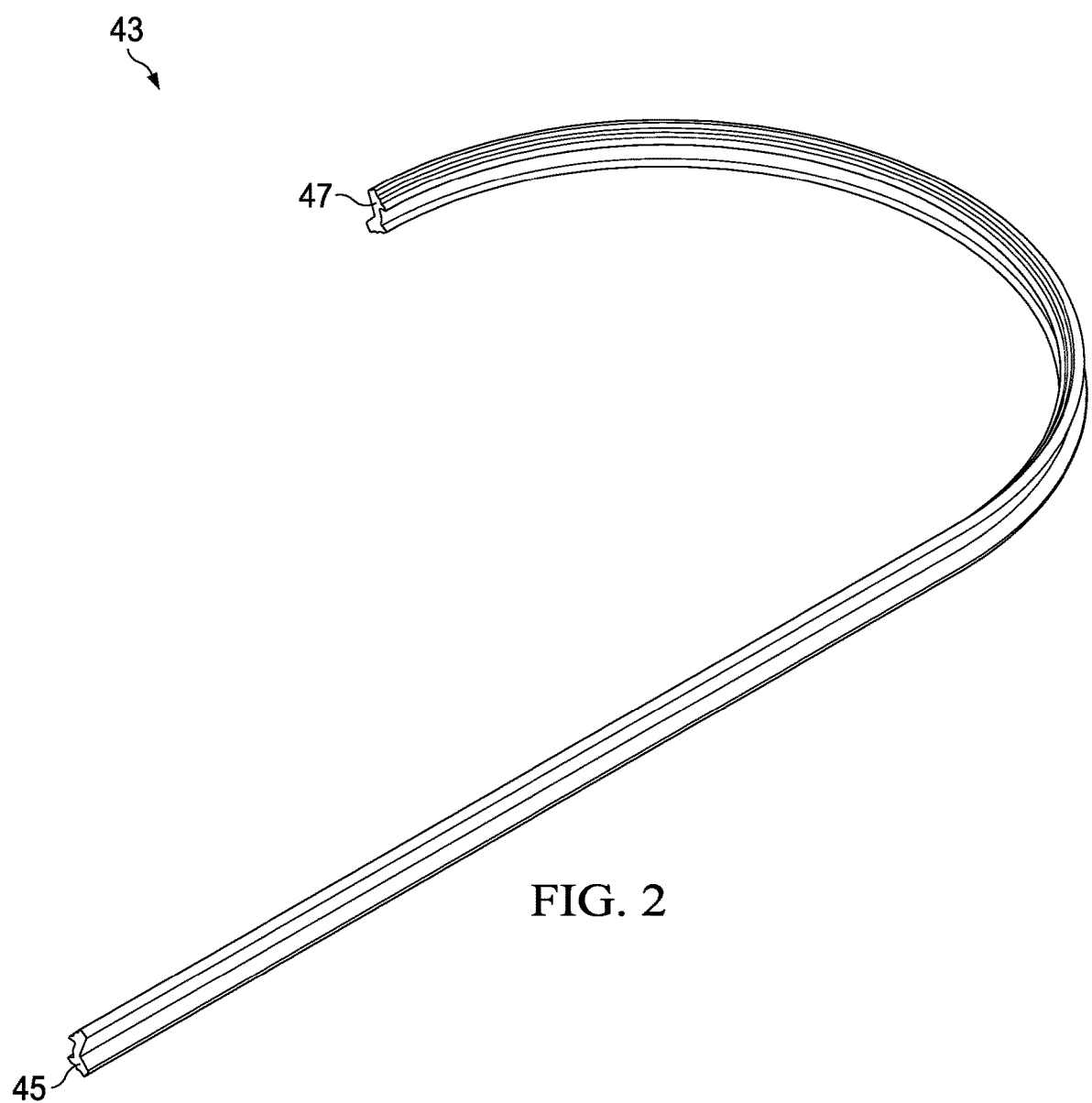
FIG. 2 is another view of the extruded rubber portion of the gasket of the invention, showing the free end portions.

The improved manufacturing method of the invention will now be described with reference primarily to FIGS. 1-9. The manufacturing technique uses a "splicing" step as a way to conveniently form the rubber portion of the sealing gasket. In the first step in the manufacturing method, a gasket section of the relatively softer rubber-like material (EPDM) is extruded to form a given length of material (43 in FIG. 1) having opposing free ends 45, 47, and having a desired final profile cross section. FIG. 2 shows the free ends 47, 45, prior to the splicing operation.

Figure 3:
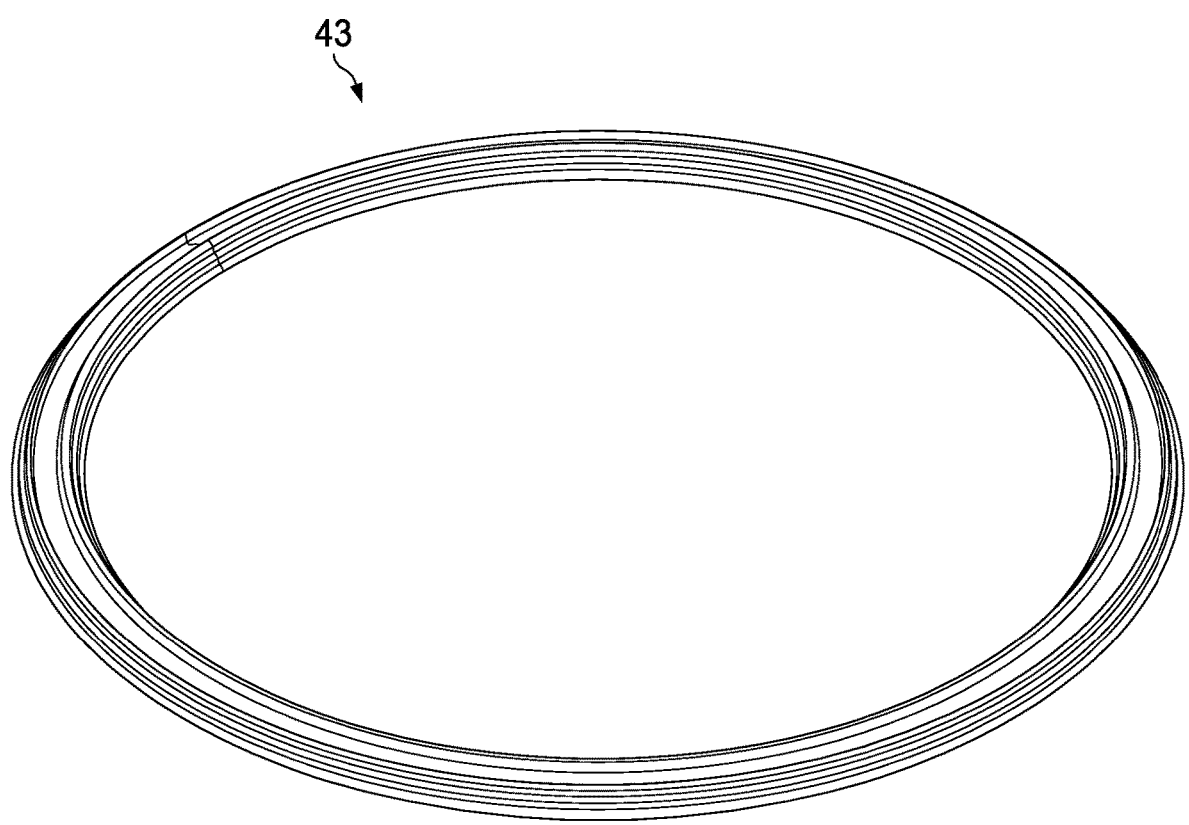
FIG. 3 is a perspective view of the extruded rubber portion of FIGS. 1 and 2 after splicing the free ends together.

FIG. 3 shows the free ends of the rubber-like portion 43 of the gasket having been spliced together to form a continuous gasket band of the rubber-like material. The splicing step can be accomplished in a number of ways. For example, the splicing step can be accomplished by using a conventional splicing adhesive to join the free ends of the gasket section. In one preferred method, the splicing step is accomplished by using using a hot PE or PP film that is placed between the two opposing free ends 45, 47, of the gasket section 43 and holding the free ends together until they cool and form a strong bond therebetween. The opposing ends 45, 47, can be heated by a heat source selected from the group consisting of a heating oven, a hot air gun, and an IR heater.

Figure 4:
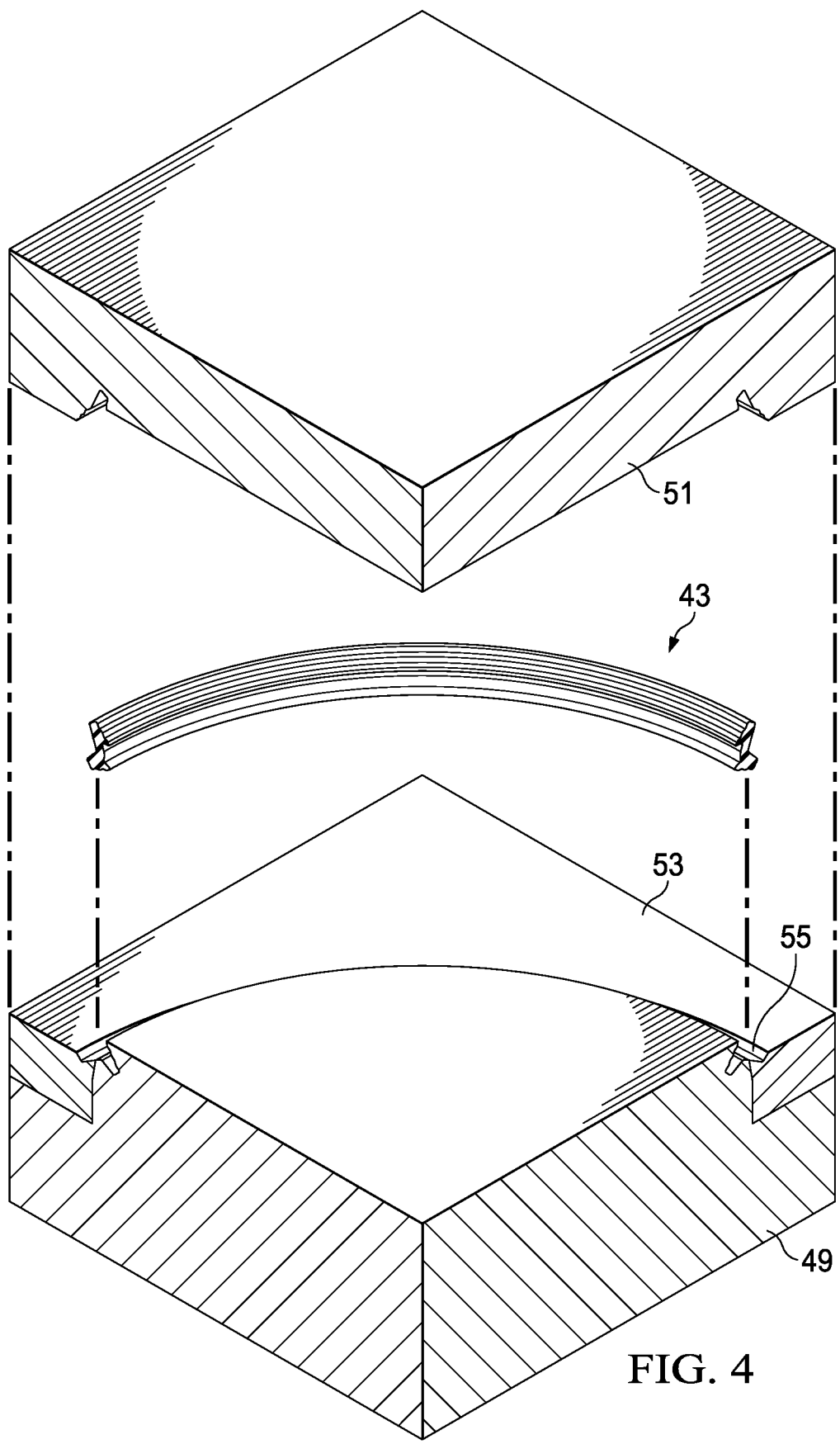
FIG. 4 shows the first step in the manufacturing process used to form the gasket of the invention in which the spliced extruded rubber portion of the gasket is placed into one section of a plastic injection mold.
Figure 5:
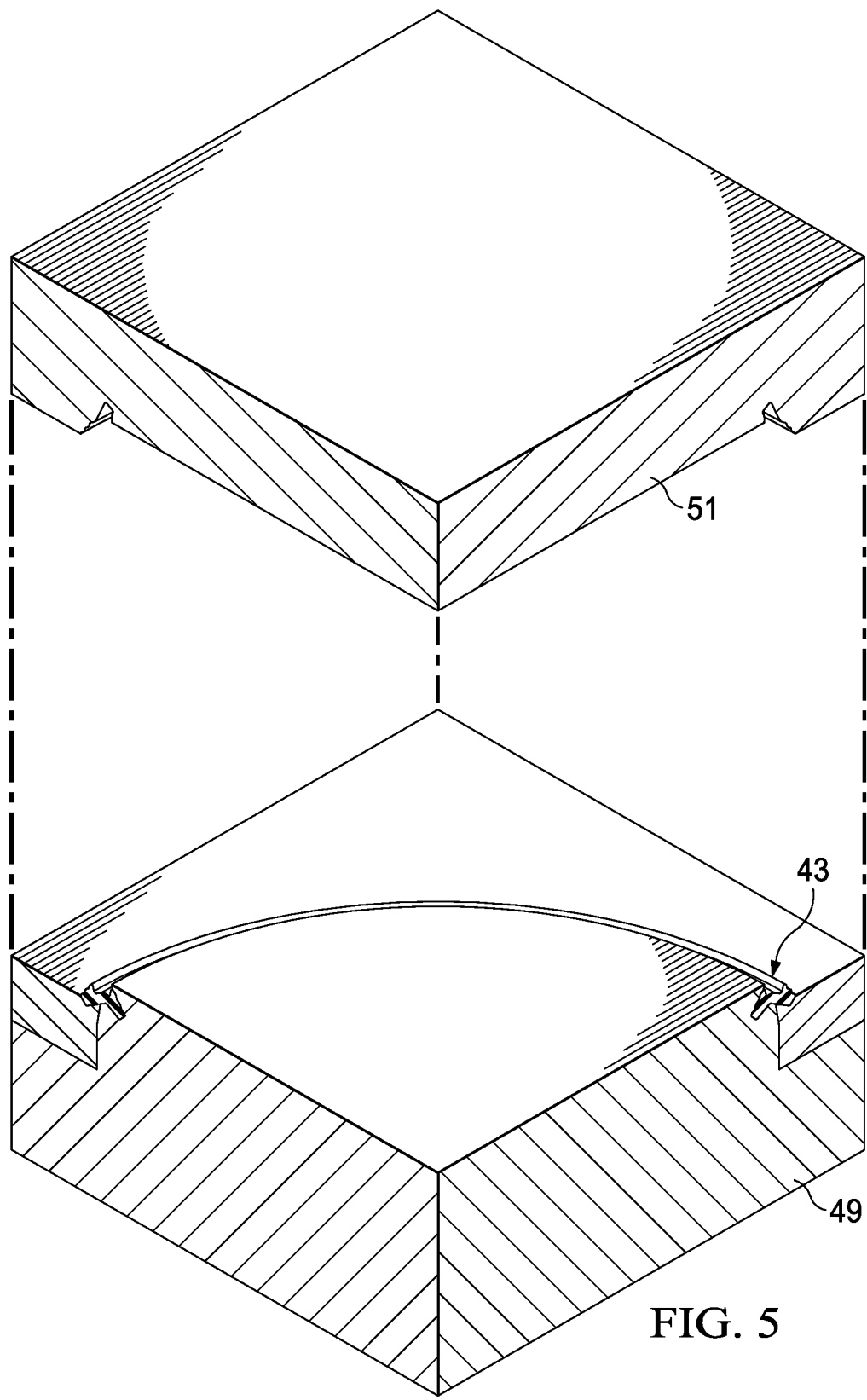
FIG. 5 shows the extruded rubber portion in place in the mold section.
Figure 6:
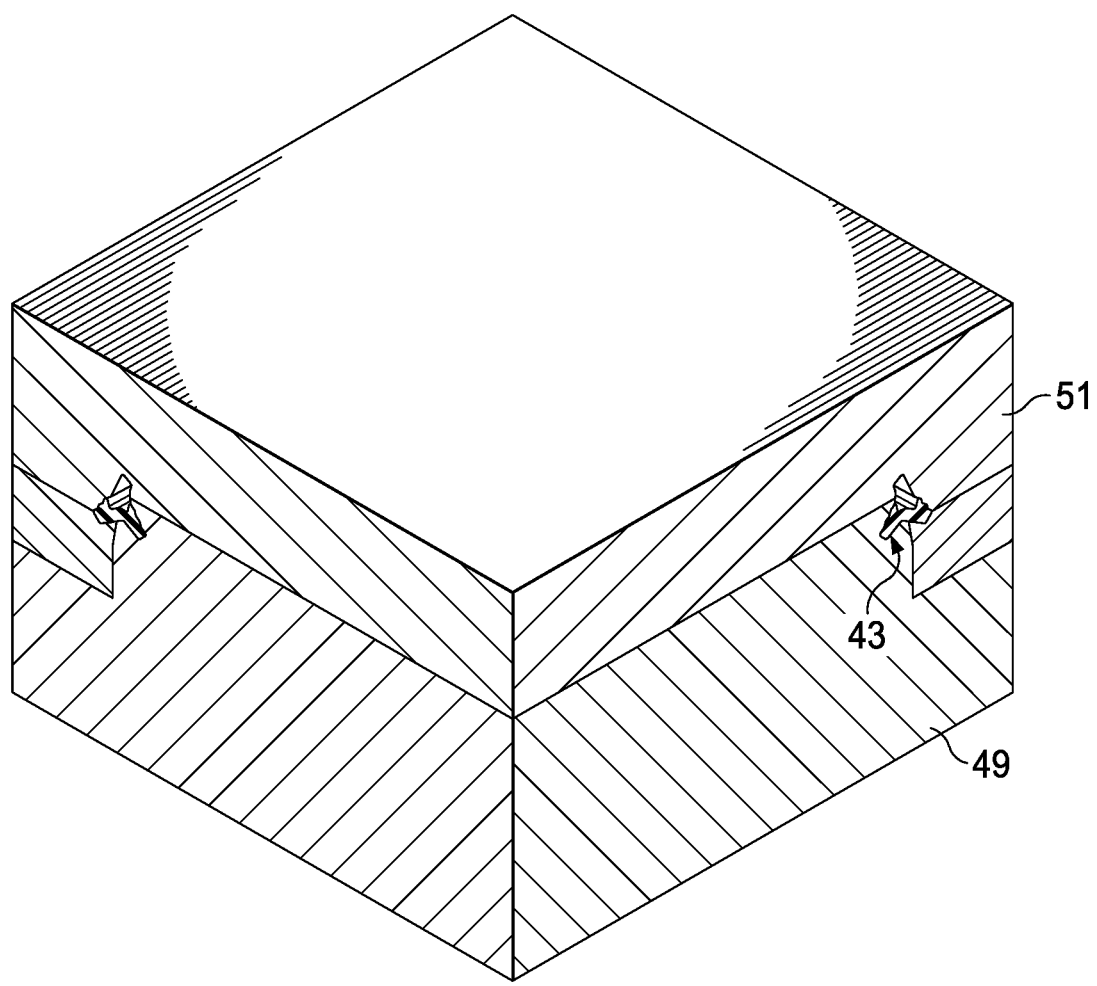
FIG. 6 is a view of the next step in the process in which the second half of the mold is moved into position and closed and prior to injecting the hard plastic material over the rubber portion of the gasket.

In the next step in the method, the EPDM ring 43 is placed in a plastic injection mold. FIG. 4 shows the band 43 being placed in the lower one half 49 of an injection molding die of the type that will be familiar to those skilled in the relevant arts. The mating upper half 51 of the mold is raised for ease of illustration. As can be seen in FIG. 4, the lower mold half 49 has a first mold face 53 with a circumferential recess 55. As shown in FIG. 5, in the next step of the manufacturing process, the EPDM band 43 is placed within the circumferential recess 55.

Figure 7:
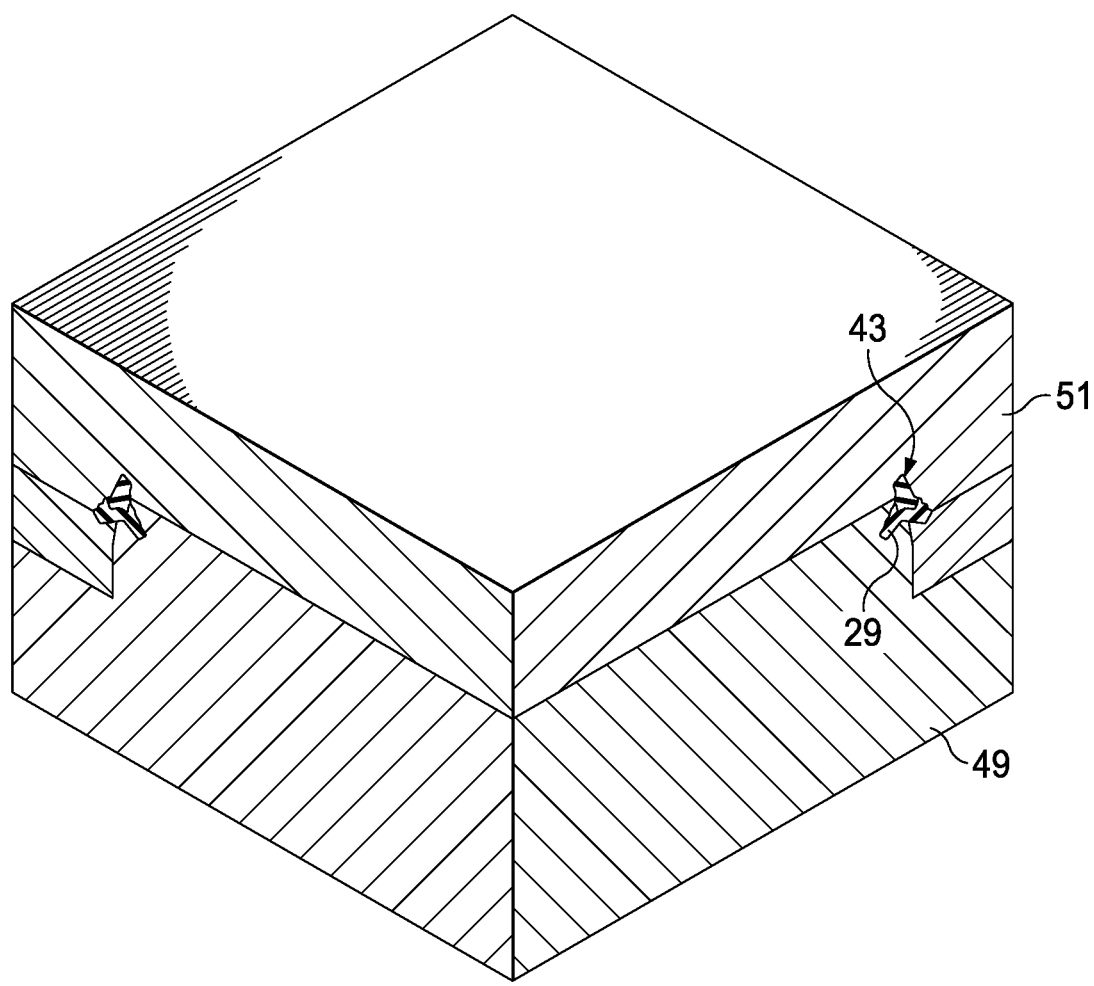
FIG. 7 is a view similar to FIG. 6, but showing the next step in the process in which the hard plastic portion of the gasket has been injected over the softer, rubber portion.
Figure 8:
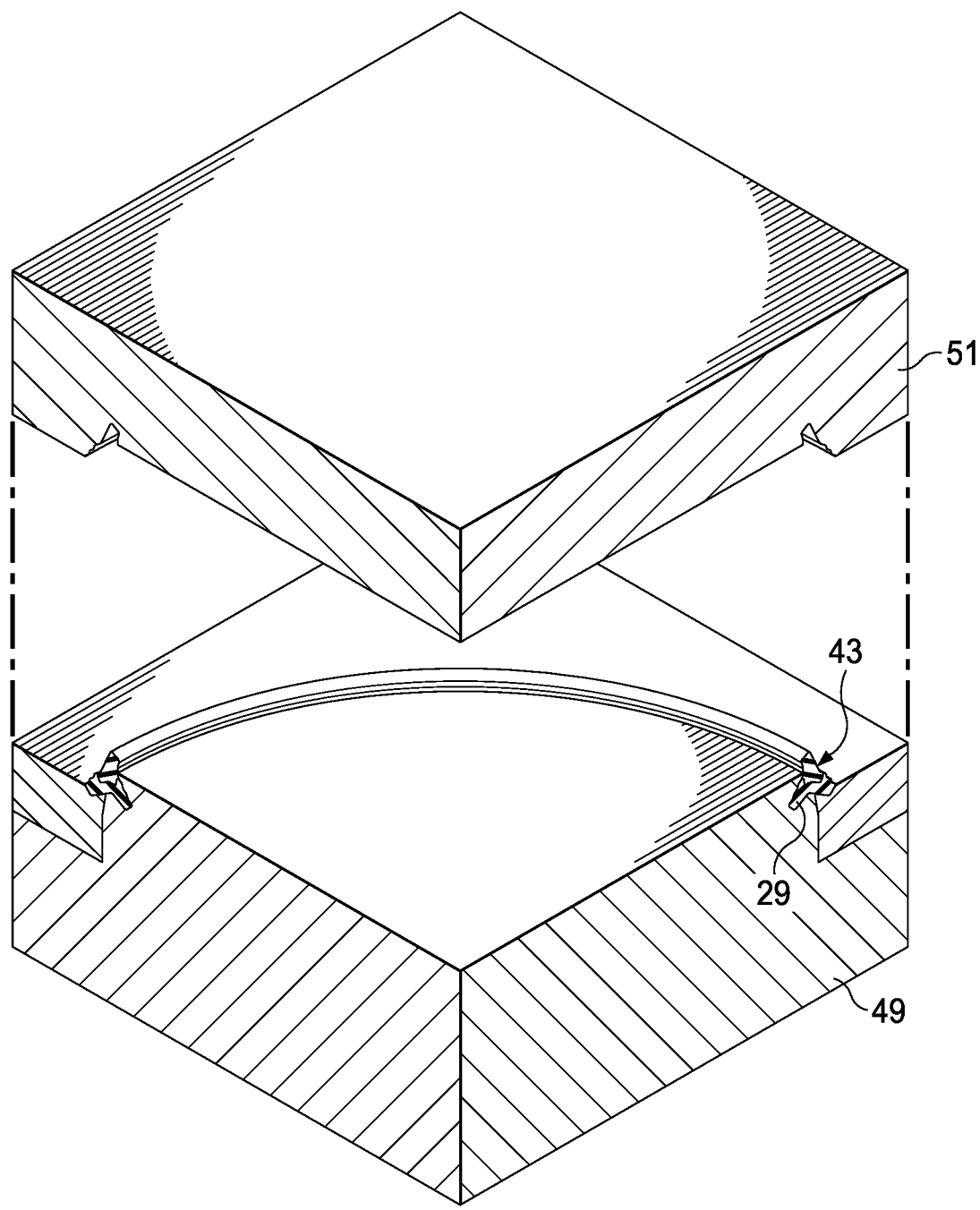
FIGS. 8 and 9 show the next steps in the process of the invention in which the mold halves are separated and the completed gasket is removed from the mold.
Figure 9:
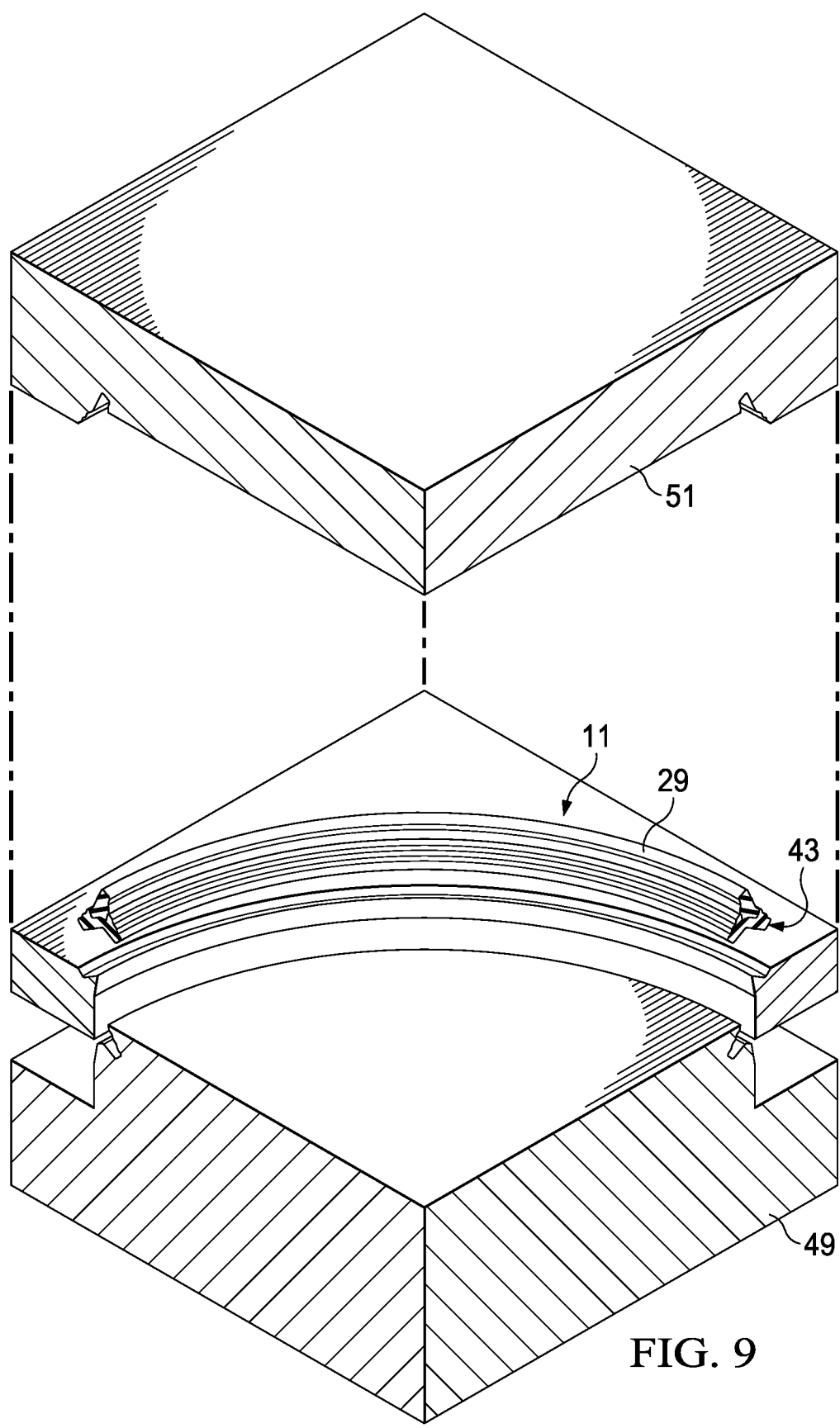

The second mold half 51 has a mold face which is essentially a mirror image of the first mold face. The first and second mold faces are then united and the relatively harder plastic material is injected over the spliced gasket band 43 in the mold and allowing the harder plastic-like material to bond to the relatively softer rubber-like gasket band to form a finished two-part sealing gasket. FIG. 7 shows the plastic portion 29 injected over the EPDM portion 43. The heat and pressure in the mold cures the rubber sealing areas and adheres them to the hard plastic band portion. In FIG. 8, the upper mold half 51 is being separated from the lower half 49. FIG. 9 shows the completed gasket 11 being removed from the lower mold half 49.

A pipe sealing gasket is thus produced which is designed for receipt within a raceway provided within a female bell socket end of a thermoplastic pipe, the female bell socket end having a given internal diameter which is designed to receive a given outer diameter of a mating male thermoplastic pipe end to form a pipe joint. The improved gasket of the invention is made up of a hard plastic ring shaped band having a leading nose region and a trailing region, the trailing region being bonded to a relatively softer elastomer ring of rubber-like material which has an outer circumferential surface which forms a seal with the raceway provided in the female bell socket and an inner circumferential surface which forms a seal with the male thermoplastic pipe end, as has been described previously. The hard plastic band supports the elastomer ring, providing adequate stiffness to develop contact pressure between the outer circumferential surface of the elastomer ring and the raceway of the bell socket end of the pipe and between the inner circumferential surface and the mating male pipe end, and wherein the gasket is formed by the following steps:

extruding a gasket section of a relatively softer rubber-like material to form a given length of material having opposing free ends and having a desired final profile cross section;

splicing the opposing free ends of the gasket section together to form a continuous gasket band of the rubber-like material;

placing the spliced gasket band in a conventional plastic injection mold;

injecting a relatively harder plastic-like material over the spliced gasket band in the mold and allowing the harder plastic-like material to bond to the relatively softer rubber-like gasket band to form a finished two-part sealing gasket.

Both the elastomer outer circumferential surface and the inner circumferential surfaces of the elastomeric ring portion of the gasket form exposed circumferential sealing surfaces, both of which are provided with a series of circumferential lands and grooves for engaging the female pipe socket end and the mating male pipe as the pipe joint is made up.

During the initial installation process of the sealing gasket within the raceway of the female pipe end, the gasket is bent and forced to conform to the annular groove. The rigid plastic portion of the gasket forces the gasket radially outward against the pipe as the male pipe end is inserted into the female belled pipe end. Due to its resiliency, the conformed exterior surface exerts pressure on the annular groove thus keeping the gasket securely in place. The presence of the relatively hard plastic band helps to firmly seat the gasket and to insure that the gasket body will not be blown out of the annular groove in use in the field. When internal pressure or external forces act on the pipe joint, the gasket reacts dynamically by absorbing the internal or external load and in turn exerts more pressure on the pipe joint to preserve the integrity of the seal.

An invention has been provided with several advantages. The sealing gaskets of the invention are ideally suited for low pressure or non-pressure sealing operations due to the lightweight and minimalistic aspects of the design. A two-component gasket is produced using a simple splicing technique which is simple and economical to implement. The method used is actually backwards from usual two-component gasket manufacturing techniques in which the softer, rubber portion of the gasket is injected over the previously formed hard plastic ring. In the resulting gaskets of the invention, the relatively softer rubber-like portion of the gasket forms the primary sealing surfaces of the gasket. The relatively harder, plastic-like material forms a continuous ring which resists any tensile forces which would tend to separate the spliced gasket band portion of the finished gasket. The PP portion of the band supports the rubber sealing surfaces and provides most of the necessary stiffness to develop adequate contact pressure against the sealing surfaces of the pipe joint (the bell raceway and the exterior of the mating male spigot). The V-type seal shape of the gasket promotes self-energizing behavior when hydrostatic pressure is applied to the resulting pipe joint.

While the invention has been shown in only one of its forms, it is not thus limited but is susceptible to various changes and modifications without departing from the spirit thereof.

What is claimed is:

1. A method of manufacturing a pipe sealing gasket designed for receipt within a raceway provided within a female bell socket end of a thermoplastic pipe, the female bell socket end having a given internal diameter which is designed to receive a given outer diameter of a mating male thermoplastic pipe end to form a pipe joint, the gasket having a hard plastic ring shaped band having a leading nose region and a trailing region, the trailing region being bonded to a relatively softer elastomer ring rubber-like material which has an outer circumferential surface which forms a seal with the raceway provided in the female bell socket and an inner circumferential surface which forms a seal with the male thermoplastic pipe end, and wherein the hard plastic band supports the elastomer ring, providing adequate stiffness to develop contact pressure between the outer circumferential surface of the elastomer ring and the raceway of the bell socket end of the pipe and between the inner circumferential surface and the mating male pipe end, the method comprising the steps of:

extruding a gasket section of a relatively softer rubber-like elastomeric material to form a given length of material having opposing free ends and having a desired final profile cross section;

splicing the opposing free ends of the gasket section together at a seam line to form a continuous gasket band of the rubber-like material joined at the seam line;

placing the spliced gasket band in a conventional plastic injection mold;

injecting a relatively harder plastic-like material over the spliced gasket band in the mold and allowing the harder plastic-like material to bond to the relatively softer rubber-like gasket band to form a finished two-part sealing gasket; and wherein the resulting finished two-part gasket comprises the relatively softer extruded elastomeric band which is bonded to the molded band of relatively harder plastic-like material.

2. The method of claim 1, wherein the relatively softer, rubber-like material is selected from the group consisting of natural and synthetic rubbers.

3. The method of claim 2, wherein the relatively softer, rubber-like material is selected from the group consisting of EPDM, TPV and other TPE materials.

4. The method of claim 1, wherein the relatively harder, plastic-like material is a polyolefin.

5. The method of claim 4, wherein the relatively harder, plastic-like material is polypropylene.

6. The method of claim 1, wherein the splicing step is accomplished by using a conventional splicing adhesive to join the free ends of the gasket section.

7. A method of manufacturing a pipe sealing gasket designed for receipt within a raceway provided within a female bell socket end of a thermoplastic pipe, the female bell socket end having a given internal diameter which is designed to receive a given outer diameter of a mating male thermoplastic pipe end to form a pipe joint, the gasket having a hard plastic ring shaped band having a leading nose region and a trailing region, the trailing region being bonded to a relatively softer elastomer ring of rubber-like material which has an outer circumferential surface which forms a seal with the raceway provided in the female bell socket and an inner circumferential surface which forms a seal with the male thermoplastic pipe end, and wherein the hard plastic band supports the elastomer ring, providing adequate stiffness to develop contact pressure between the outer circumferential surface of the elastomer ring and the raceway of the bell socket end of the pipe and between the inner circumferential surface and the mating male pipe end, the method comprising the steps of:

extruding a gasket section of a relatively softer rubber-like elastomeric material to form a given length of material having opposing free ends and having a desired final profile cross section;

splicing the opposing free ends of the gasket section together at a seam line to form a continuous gasket band of the rubber-like material joined at the seam line, the splicing being accomplished by using a hot PE or PP film that is placed between the two opposing free ends of the gasket section and holding the free ends together until they cool and form a strong bond therebetween;

placing the spliced gasket band in a conventional plastic injection mold;

injecting a relatively harder plastic-like material over the spliced gasket band in the mold and allowing the harder plastic-like material to bond to the relatively rubber-like gasket band to form a finished two-part sealing gasket.

8. The method of claim 7, wherein the opposing free ends of the gasket section are heated by a heat source selected from the group consisting of a heating oven, a hot air gun, and an IR heater.

9. The method of claim 7, wherein the relatively softer, rubber-like material is selected from the group consisting of EPDM, TPV and other TPE materials.

10. The method of claim 7, wherein the relatively harder, plastic-like material is a polyolefin.

11. The method of claim 10, wherein the relatively harder, plastic-like material is polypropylene.

\* \* \* \* \*